United States Patent Office 3,102,959
Patented Sept. 3, 1963

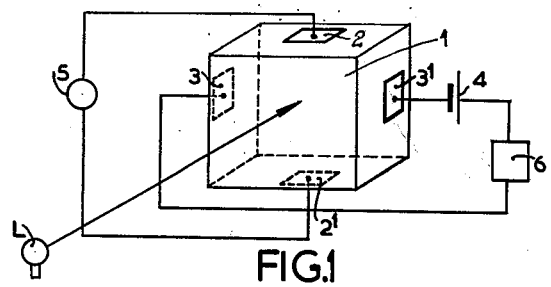
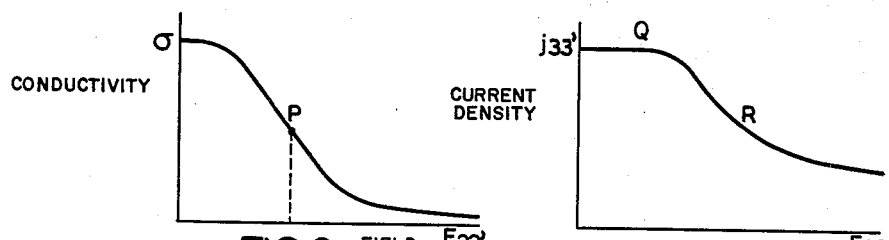
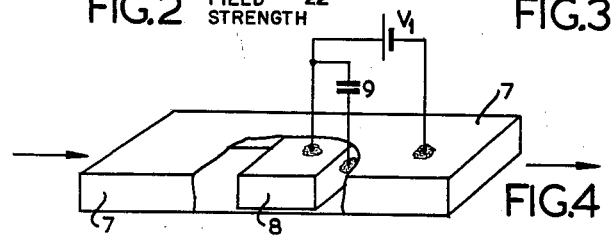
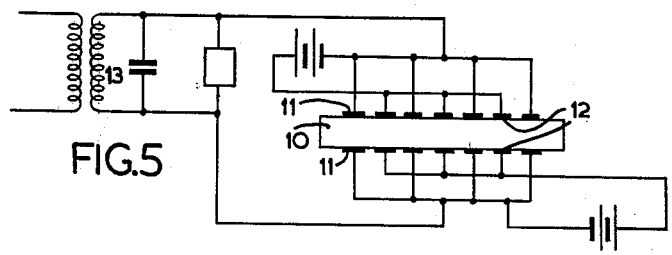
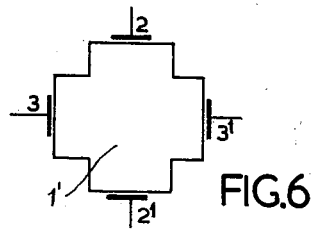

3,102,959
DEVICE FOR AMPLIFYING, PRODUCING OR MODULATING ELECTRICAL OSCILLATIONS
Gesinus Diemer, Eindhoven, Netherlands, assignor to North American Philips Company, Inc., New York, N.Y., a corporation of Delaware
Filed June 16, 1958, Ser. No. 742,239
Claims priority, application Netherlands June 26, 1957
6 Claims. (Cl. 250—211)

This invention relates to devices for amplifying, producing or modulating electrical oscillations and has for its purpose such a device which is of a simple design and operates without vacuum tubes or transistors.

Amplifiers for electric voltages have previously been suggested which contain an electro-luminescent element, at the electrodes of which the voltage to be amplified is applied and which also contain a photo-sensitive device couplied by optical means to this element and likewise provided with electrodes between which a voltage source and an output impedance are connected in series.

In a prior patent application there has also been suggested an apparatus in which the electric power is supplied to the electrodes of a luminescent layer which is brought to luminescence by irradiation by means of a source of radiation, the element which consists of said layer and two electrodes being combined with an element containing a photo-sensitive layer provided with electrodes and connected in series with a voltage source and a load impedance so that the luminescent radiation of the first-mentioned layer acts upon the electrical impedance of the photo-sensitive layer.

The present invention utilizes a photo-conductive material showing the phenomenon of the so-called "field quenching," such as zinc cadmium sulfoselenide activated with a small amount of silver, which preferably contains a smaller amount of cobalt, iron or nickel. This substance, when a suitable electric voltage (V) is applied between two electrodes provided thereon, has a current-voltage characteristic which is curved and non-linear towards the V-axis and is declined (negative slope) in certain regions. Other suitably activated chalcogenides also exhibit this phenomenon, which otherwise is not limited to chalcogenides.

Said phenomenon may be explained in the following way.

The free charge carries (electrons and holes) produced upon irradiation of a material of the above-mentioned kind with light of a given wave-length are supposed to continously recombine, which recombination is delayed in the presence of silver, so that with the dynamic equilibrium between excitation and recombination a number of free charge carriers exist which is larger than corresponds to the concentration at thermal equilibrium present in the substance without irradiation at the temperature prevailing. The action of the silver is to hold the positive charges produced upon excitation, so that it is more difficult for the free negative charges to recombine with the positive charges. However, by the action of an electric field, it is possible to release the positive charges from the silver centres so as to enable them to move through the solid material.

If the zinc-cadmium sulfoselenide activated with silver contains certain further elements, such as Fe, Co or Ni (so-called killers) in a very small concentration, then upon application of an electric field the positive charges released in these killer centres may readily recombine with the negative charges, so that the concentration of free charge carriers becomes considerably smaller than was the case in the absence of the field.

The field quenching thus results in an increased speed of recombination of the free charge carriers which were present in a concentration greater than the concentration at thermal equilibrium corresponding to the temperature prevailing, when the field in the photo-conductive material is increased and hence the specific conductivity is decreased.

The present invention consists in that a device for amplifying, producing or modulating electric power contains a piece of semi-conductive solid material which exhibits the phenomenon of field quenching, and means are provided for producing in the material a concentration of free charge carriers which differs from the concentration at thermal equilibrium corresponding to the operating temperature, the concentration of the free charge carries being modulated by the variation of an electric field in the interior of the semi-conductor.

It is not strictly necessary for the charge carriers to be released by irradiation by means of an artifical external source of light. Under certain conditions, irradiation with day-light is possible or a radio-active substance may be provided in or in the vicinity of the semi-conductive material. It is also possible that the non-equilibrium concentration is effected by injection of free charge carriers by means of one or more rectifying contacts to the semi-conductor or p-n junctions within the semi-conductor polarised in the forward direction.

The material may be provided with two electrodes to which a circuit is connected in which the voltages to be amplified, modulated or mixed are active. It is also possible to utilize two pairs of electrodes and two circuits for the input and output voltages (quadripole), in which event, as is common practice, two electrodes associated with different circuits may be combined to form a tripole. Furthermore, for special use, it is possible to provide more than two pairs of contacts.

In order that the invention may be readily carried into effect, it will now be described in detail, by way of example, with reference to the accompanying drawing, wherein: FIG. 1 is a perspective, partially schematic view of one embodiment according to the invention;

FIG. 2 is a graph showing the conductivity-electric field strength characteristic of the device of FIG. 1;

FIG. 3 is a graph showing the current density-electric field strength characteristic of the device of FIG. 1;

FIG. 4 is a perspective view of a microwave modification;

FIG. 5 shows a modification employing carrier injection;

FIG. 6 illustrates an improved geometry of the semi-conductor to enhance the interaction.

FIG. 1 shows the structure of a device according to the invention in a simple form. Reference numeral 1 indicates a cube-like element which consists, for example, of zinc-cadmium sulfoselenide and which may contain a plurality of crystals of this substance. It is assumed that a light source L is present which irradiates the element so that free charge carriers are released preferably throughout in the interior. The light rays are perpendicular to the front face of the cube. The body has two input electrodes 2 and 2', between which a signal source 5 is connected. The signal source may provide the superposition of a constant direct-voltage $V_1$ and a variable signal voltage. The electrodes bring about an electric field which is preferably homogeneous. A series-combination of a biasing voltage source 4 and an output impedance 6 is connected between output electrodes 3 and 3'. A field is produced between the electrodes 3 and 3' which is weaker than the field produced by $V_1$ and the lines of force of which are substantially at right angles to those of the field produced by $V_1$. The dimensions of the cube may be of the order of 1 or 2 millimeters. The smaller the dimensions, the stronger the electric field can be made.

It has been found that the relationship between the conductivity 6 and the fieldstrength in $E_{22}'$ the material 1 may be represented by a curve as shown in FIG. 2. If the fieldstrength exceeds a determined value, the above-mentioned rapid recombination due to the killers results in a decrease in the number of free charge carriers such that the conductivity also considerably decreases. Within a given region, this decrease may be more than linear with the increase of the total internal fieldstrength. In practical use, the fieldstrength $E_{22}'$ produced by the electrodes 2 and 2' is preferably chosen such that the work-point lies approximately at point P.

The material of the element is essentially ZnS in which part (for instance 50%) of the Zn is replaced by Cd and also part (also for instance 50%) of the S is replaced by Se. The activator can be in the form of a sulfide $Ag_2S$ in a quantity of at most 100 parts per million ($10^{-2}\%$) and the killer (a sulfide) in a quantity of 10 parts per million ($10^{-3}\%$).

FIG. 3 shows the relationship between the current density $j_{33}'$ between the electrodes 3 and 3' and the fieldstrength $E_{22}'$. This curve may be deduced from the curve shown in FIG. 2, since the current density is the product of fieldstrength and conductivity. It appears that the portion between Q and R is declined and, when adjusted to this portion, the device is thus suitable for amplifying or producing electrical oscillations. Since there is no linear relationship between the current strength and the voltage applied, the device is suitable not only for amplifying signals which are not too great but also for modulating a voltage on another voltage or deriving a voltage having a frequency equal to the difference or the sum of the frequencies of two other voltages.

FIG. 4 shows the application of the invention to a wave-guide 7 which contains a cube-like piece of material 8 as afore-mentioned. By producing an electric field of suitable strength in the direction of the electric lines of force of the high-frequency field by means of a constant direct-voltage $V_1$, the damping of the oscillations of this high-frequency field is reduced and the wave is passed in amplified form. Reference numeral 9 indicates a smoothing capacitor.

FIG. 5 shows a method of injecting the charge carriers into a piece of sheet material as mentioned before. Provided on a strip 10 of this semi-conductive material there are alternately a series of ohmic contacts 11 which are connected to a circuit 13 fed with the signal to be amplified and rectifying contacts or injecting electrodes 12, which are polarized with respect to the contacts 11 so that injection of free charge carriers occurs. The output electrode system is not shown.

FIG. 6 shows a modified arrangement for amplifying an input voltage active between two electrodes 2 and 2'. The device is the same as that shown in FIG. 1 except that the semiconductor element 1' is cross-shaped. The stray field lines extending through the semiconductor material between two adjacent electrodes can thus be lengthened.

An increase or decrease in temperature with respect to the normal room temperature frequently results in an improvement of the effect.

What is claimed is:

1. An electrical device comprising a carrier-density, electric-field-quenchable, photoconductive body having the property that any free charge carrier concentration within it greater than that corresponding to thermal equilibrium is reduced in the presence of an electric field, electrode means coupled to the body including a voltage source for causing to pass through the body between the electrode means a current whose magnitude depends upon the free charge carrier concentration within the body, which produce a current-voltage characteristic of the device, means for establishing within the body a free charge carrier concentration greater than that corresponding to thermal equilibrium to increase the current through the body between the electrode means, and means for establishing an electric field within the body that reduces the concentration of free charge carriers and thus the current flow between the electrode means, whereby the current-voltage characteristic of the device exhibits a region of negative slope.

2. A device as set forth in claim 1 wherein the free-charge-carrier-establishing means comprises means for irradiating the body.

3. A device as set forth in claim 1 wherein the free-charge-carrier-establishing means comprises a rectifying contact to the body.

4. An electrical device comprising a carrier-density, electric-field-quenchable, photoconductive body containing both an activator and a killer and having the property that any free charge carrier concentration within it greater than that corresponding to thermal equilibrium is reduced in the presence of an electric field, electrode means coupled to the body including a voltage source for causing to pass through the body between the electrode means a current whose magnitude depends upon the free charge carrier concentration within the body, which produce a current-voltage characteristic of the device, means for establishing within the body a free charge carrier concentration greater than that corresponding to thermal equilibrium to increase the current through the body between the electrode means, and means for establishing an electric field within the body that reduces the concentration of free charge carriers and thus the current flow between the electrode means, whereby the current-voltage characteristic of the device exhibits a region of negative slope.

5. A device as set forth in claim 4 wherein the electric-field-establishing means includes a pair of electrodes connected to the body such that a line between them is substantially at right angles to a line between the said electrode means.

6. A device as set forth in claim 4 wherein a wave guide encloses the said photoconductive body.

References Cited in the file of this patent

UNITED STATES PATENTS

| | | |
|---|---|---|
| 2,582,850 | Rose | Jan. 15, 1952 |
| 2,778,956 | Dacey et al. | Jan. 22, 1957 |
| 2,794,863 | Roosbroeck | June 4, 1957 |
| 2,860,218 | Dunlap | Nov. 11, 1958 |
| 2,862,189 | Kuhrt | Nov. 25, 1958 |

FOREIGN PATENTS

| | | |
|---|---|---|
| 1,089,676 | France | Mar. 21, 1955 |

OTHER REFERENCES

Sensitive Hall Measurements on NaCl and on Photoconductive PbTe, The Physical Review, vol. 92, No. 2, Oct. 15, 1953, pp. 215–218.

Photoelectromagnetic Effect in Indium Arsenide, Physical Review, vol. 107, No. 2, July 15, 1957, pp. 374–378.

Annales De Radioelectricite, vol. 9, No. 38, October 1954, article by Grovalet, pp. 360–365.